(12) United States Patent
Zhang

(10) Patent No.: US 10,348,568 B2
(45) Date of Patent: Jul. 9, 2019

(54) METHOD AND APPARATUS FOR PERFORMING COMMUNICATION IN SOFTWARE-DEFINED NETWORKING, AND COMMUNICATIONS SYSTEM

(71) Applicant: Huawei Technologies Co., Ltd., Shenzhen (CN)

(72) Inventor: Wei Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 69 days.

(21) Appl. No.: 15/705,912

(22) Filed: Sep. 15, 2017

(65) Prior Publication Data

US 2018/0006891 A1  Jan. 4, 2018

Related U.S. Application Data

(63) Continuation of application No. PCT/CN2015/074460, filed on Mar. 18, 2015.

(51) Int. Cl.
*H04L 12/24* (2006.01)
*H04L 12/26* (2006.01)
(Continued)

(52) U.S. Cl.
CPC .......... *H04L 41/0893* (2013.01); *H04L 43/14* (2013.01); *H04L 45/745* (2013.01);
(Continued)

(58) Field of Classification Search
None
See application file for complete search history.

(56) References Cited

U.S. PATENT DOCUMENTS

2009/0031394 A1  1/2009  Kavanagh et al.
2010/0095367 A1* 4/2010  Narayanaswanny ........................
H04L 63/0245
726/12
(Continued)

FOREIGN PATENT DOCUMENTS

CN  103152361 A  6/2013
CN  103685058 A  3/2014

OTHER PUBLICATIONS

Raza et al.; "The Proposal for SDN Supported Future 5g Networks"; RACS'14; Oct. 5-8, 2014; 6 pages.
(Continued)

*Primary Examiner* — Diane L Lo

(57) ABSTRACT

Embodiments of the present disclosure provide a method and an apparatus for performing communication in software-defined networking, and a communications system. The method includes: receiving a message sent by a network device, where the message includes a signaling message; determining, according to a control policy, a matching condition that matches the message, where the control policy includes a matching condition and operation information corresponding to the matching condition; processing the message according to the operation information corresponding to the matching condition that matches the message; and sending the processed message to the network device. According to the method and the apparatus for performing communication in software-defined networking, and the communications system in the present disclosure, a problem in the prior art that a control device serving as a network control center cannot communicate with a base station is resolved.

17 Claims, 7 Drawing Sheets

(51) Int. Cl.
*H04L 12/741* (2013.01)
*H04L 29/12* (2006.01)
*H04L 29/06* (2006.01)
*H04L 29/08* (2006.01)

(52) U.S. Cl.
CPC .......... *H04L 61/2007* (2013.01); *H04L 69/22* (2013.01); *H04L 69/324* (2013.01)

(56) References Cited

U.S. PATENT DOCUMENTS

| | | | |
|---|---|---|---|
| 2013/0170435 A1* | 7/2013 | Dinan | H04L 45/50 370/328 |
| 2014/0075498 A1* | 3/2014 | Porras | H04L 63/107 726/1 |
| 2016/0050148 A1* | 2/2016 | Xu | H04L 47/24 370/235 |
| 2016/0127506 A1* | 5/2016 | Shinohara | H04L 12/6418 709/221 |
| 2016/0277299 A1* | 9/2016 | Kadaba | H04L 12/56 |
| 2017/0142032 A1* | 5/2017 | Heinonen | H04L 49/70 |

OTHER PUBLICATIONS

Open Networking Foundation; "The Benefits of Multiple Flow Tables and TTPs"; Version No. 1.0; ONF TR-510; Feb. 2, 2015; 9 pages.

* cited by examiner

METHOD AND APPARATUS FOR PERFORMING COMMUNICATION IN SOFTWARE-DEFINED NETWORKING, AND COMMUNICATIONS SYSTEM

CROSS-REFERENCE TO RELATED APPLICATIONS

This application is a continuation of International Application No. PCT/CN2015/074460, filed on Mar. 18, 2015, the disclosure of which is hereby incorporated by reference in its entirety.

TECHNICAL FIELD

Embodiments of the present application relate to the communications technologies, and in particular, to a method and an apparatus for performing communication in software-defined networking, and a communications system.

BACKGROUND

Software-defined networking (SDN, Software Defined Network) is a new network architecture put forward by Stanford University in the United States. A core idea of the SDN is separation of control and bearer. A data plane and a control plane of a network are separated, so that the control plane is independent, and control plane centralization is formed.

In the prior art, with development of the SDN in a wired network system, Stanford University also considers introducing the idea of the SDN into an existing wireless communications network. That is, a control plane of a base station device of a wireless network is independent, to form a wireless network operating information system (OS, Operation System). A conventional base station is simplified into a base station device with a single function (that is, the base station only performs data plane processing), and the wireless OS becomes a control center of the network to control a behavior of a base station device in the network.

However, in the prior art, there is a problem that a control device serving as a network control center cannot communicate with a base station.

SUMMARY

The present disclosure provides a method and an apparatus for performing communication in software-defined networking, and a communications system, so as to resolve a problem in the prior art that a control device serving as a network control center cannot communicate with a base station.

According to a first aspect, the present disclosure provides a method for performing communication in software-defined networking, where the method includes:
 receiving a message sent by a network device, where the message includes a signaling message;
 determining, according to a control policy, a matching condition that matches the message, where the control policy includes a matching condition and operation information corresponding to the matching condition;
 processing the message according to the operation information corresponding to the matching condition that matches the message; and
 sending the processed message to the network device.
 With reference to the first aspect, in a first possible implementation manner of the first aspect, before the determining, according to a control policy, a matching condition that matches the message, the method further includes:
 receiving the control policy sent by the network device.
 With reference to the first aspect or the first possible implementation manner of the first aspect, in a second possible implementation manner of the first aspect, the method further includes:
 determining a flow table according to the control policy, where each flow entry in the flow table includes a matching condition and operation information corresponding to the matching condition;
 the determining a matching condition that matches the message specifically includes:
 determining, according to the flow table, that a matching condition of a first flow entry is the matching condition that matches the message; and
 the processing the message according to the operation information corresponding to the matching condition that matches the message specifically includes:
 processing the message according to operation information of the first flow entry.
 With reference to the second possible implementation manner of the first aspect, in a third possible implementation manner of the first aspect, the flow table further includes a second flow entry, a matching condition of the second flow entry includes a source Internet Protocol IP address and a destination IP address, and operation information of the second flow entry includes peeling off an IP header of a message and applying message content of the message.
 With reference to any one of the first aspect, or the first to the third possible implementation manners of the first aspect, in a fourth possible implementation manner of the first aspect, the matching condition in the control policy includes at least one of the following conditions:
 a radio network temporary identifier RNTI, a channel identifier, a logical channel identifier LCID, an antenna identifier, a source IP address, a destination IP address, a source port, or a destination port.
 With reference to any one of the first aspect, or the first to the fourth possible implementation manners of the first aspect, in a fifth possible implementation manner of the first aspect, the operation information in the control policy includes at least one of the following operations:
 peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.
 With reference to the fifth possible implementation manner of the first aspect, in a sixth possible implementation manner of the first aspect, the message further includes a data message; and
 the operation further includes: peeling off a radio link message header of a message, and sending message content of the message; or performing, based on an air interface protocol, packetization on the message, and sending data obtained by performing the packetization.
 According to a second aspect, the present disclosure provides a method for performing communication in software-defined networking, where the method includes:

generating a control policy, where the control policy includes a matching condition and operation information corresponding to the matching condition; and sending the control policy to a network device, where the operation information is used to process a message that is received by the network device and that matches the matching condition, and the message includes a signaling message.

With reference to the second aspect, in a first possible implementation manner of the second aspect, the matching condition in the control policy includes at least one of the following conditions:

a radio network temporary identifier RNTI, a channel identifier, a logical channel identifier LCID, an antenna identifier, a source Internet Protocol IP address, a destination IP address, a source port, or a destination port.

With reference to the second aspect or the first possible implementation manner of the second aspect, in a second possible implementation manner of the second aspect, the operation information in the control policy includes at least one of the following operations:

peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.

With reference to the second possible implementation manner of the second aspect, in a third possible implementation manner of the second aspect, the message further includes a data message; and the operation further includes: peeling off a radio link message header of a message, and sending message content of the message; or performing, based on an air interface protocol, packetization on the message, and sending data obtained by performing the packetization.

With reference to any one of the second aspect, or the first to the third possible implementation manners of the second aspect, in a fourth possible implementation manner of the second aspect, after the sending the control policy to a network device, the method further includes:

sending a first signaling message to the network device according to the matching condition in the control policy, so that the network device determines, according to the control policy, a matching condition that matches the first signaling message.

According to a third aspect, the present disclosure provides an apparatus for performing communication in software-defined networking, the apparatus is a network device, and the apparatus includes:

a receiving module, configured to receive a message sent by a network device, where the message includes a signaling message;

a processing module, configured to determine, according to a control policy, a matching condition that matches the message, where the control policy includes a matching condition and operation information corresponding to the matching condition; and process the message according to the operation information corresponding to the matching condition that matches the message; and a sending module, configured to send the processed message to the network device.

With reference to the third aspect, in a first possible implementation manner of the third aspect, the receiving module is further configured to: receive the control policy sent by the network device.

With reference to the third aspect or the first possible implementation manner of the third aspect, in a second possible implementation manner of the third aspect, the processing module is further configured to determine a flow table according to the control policy, and each flow entry in the flow table includes a matching condition and operation information corresponding to the matching condition; and the processing module is specifically configured to determine, according to the flow table, that a matching condition of a first flow entry is the matching condition that matches the message; and process the message according to operation information of the first flow entry.

With reference to the second possible implementation manner of the third aspect, in a third possible implementation manner of the third aspect, the flow table further includes a second flow entry, a matching condition of the second flow entry includes a source Internet Protocol IP address and a destination IP address, and operation information of the second flow entry includes peeling off an IP header of a message and applying message content of the message.

With reference to any one of the third aspect, or the first to the third possible implementation manners of the third aspect, in a fourth possible implementation manner of the third aspect, the matching condition in the control policy includes at least one of the following conditions:

a radio network temporary identifier RNTI, a channel identifier, a logical channel identifier LCID, an antenna identifier, a source IP address, a destination IP address, a source port, or a destination port.

With reference to any one of the third aspect, or the first to the fourth possible implementation manners of the third aspect, in a fifth possible implementation manner of the third aspect, the operation information in the control policy includes at least one of the following operations:

peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.

With reference to the fifth possible implementation manner of the third aspect, in a sixth possible implementation manner of the third aspect, the message further includes a data message; and the operation further includes: peeling off a radio link message header of a message, and sending message content of the message; or performing, based on an air interface protocol, packetization on the message, and sending data obtained by performing the packetization.

According to a fourth aspect, the present disclosure provides an apparatus for performing communication in software-defined networking, the apparatus is a network device, and the apparatus includes:

a processing module, configured to generate a control policy, where the control policy includes a matching condition and operation information corresponding to the matching condition; and a sending module, configured to send the control policy to a network device, where the operation information is used to process a message that is received by the network device and that matches the matching condition, and the message includes a signaling message.

With reference to the fourth aspect, in a first possible implementation manner of the fourth aspect, the matching condition in the control policy includes at least one of the following conditions:

a radio network temporary identifier RNTI, a channel identifier, a logical channel identifier LCID, an antenna identifier, a source Internet Protocol IP address, a destination IP address, a source port, or a destination port.

With reference to the fourth aspect, or the first possible implementation manner of the fourth aspect, in a second possible implementation manner of the fourth aspect, the operation information in the control policy includes at least one of the following operations:

peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.

With reference to the second possible implementation manner of the fourth aspect, in a third possible implementation manner of the fourth aspect, the message further includes a data message; and the operation further includes: peeling off a radio link message header of a message, and sending message content of the message; or performing, based on an air interface protocol, packetization on the message, and sending data obtained by performing the packetization.

With reference to any one of the fourth aspect, or the first to the third possible implementation manners of the fourth aspect, in a fourth possible implementation manner of the fourth aspect, the processing module is further configured to generate a first signaling message according to the matching condition in the control policy; and the sending module is further configured to send the first signaling message to the network device, so that the network device determines, according to the control policy, a matching condition that matches the first signaling message.

According to a fifth aspect, the present disclosure provides a communications system, including the network device according to any one of the third aspect, or the first to the sixth possible implementation manners of the third aspect, and the network device according to any one of the fourth aspect, or the first to the fourth possible implementation manners of the fourth aspect.

The present disclosure provides a method and an apparatus for performing communication in software-defined networking, and a communications system. A message sent by a network device is received, where the message includes a signaling message; a matching condition that matches the message is determined according to a control policy, where the control policy includes a matching condition and operation information corresponding to the matching condition; the message is processed according to operation information corresponding to the matching condition that matches the message; and the processed message is sent to the network device. In this way, a base station can process a message according to a control policy, and a problem in the prior art that a control device serving as a network control center cannot communicate with the base station is resolved.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
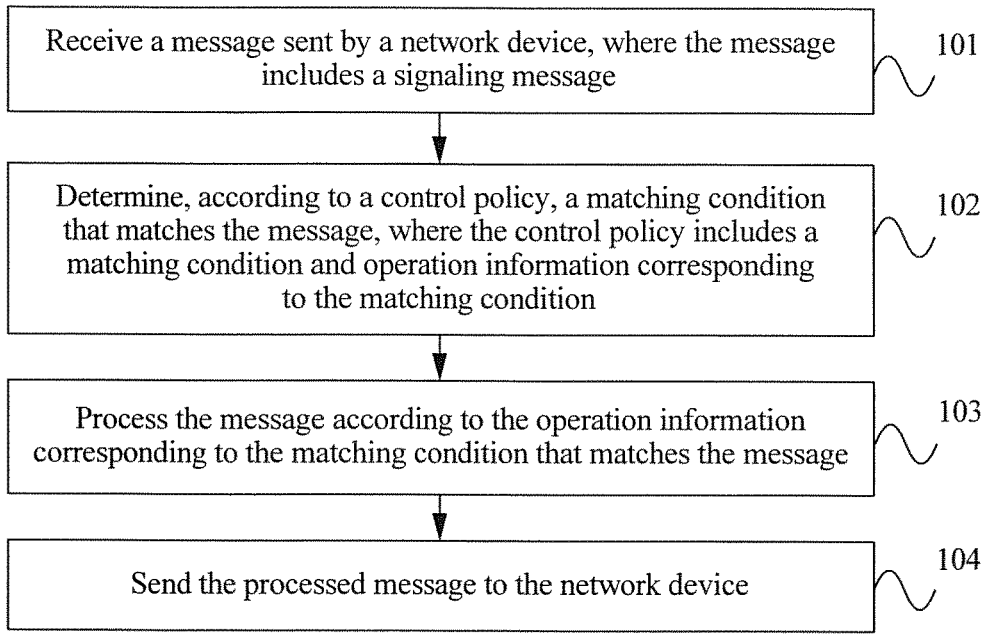
FIG. 1 is a flowchart of Embodiment 1 of a method for performing communication in SDN according to the present disclosure.

FIG. 1 is a flowchart of Embodiment 1 of a method for performing communication in SDN according to the present disclosure. As shown in FIG. 1, the method in this embodiment may include the following steps.

Step 101: Receive a message sent by a network device, where the message includes a signaling message.

Optionally, the network device may be UE, a base station, a server, a control device, or the like.

Step 102: Determine, according to a control policy, a matching condition that matches the message, where the control policy includes a matching condition and operation information corresponding to the matching condition.

Step 103: Process the message according to the operation information corresponding to the matching condition that matches the message.

Step 104: Send the processed message to the network device.

Optionally, the matching condition in the control policy includes at least one of the following conditions:

a radio network temporary identifier (RNTI), a channel identifier, a logical channel identifier (LCID), an antenna identifier, a source IP address, a destination IP address, a source port, or a destination port.

Optionally, the operation information in the control policy includes at least one of the following operations:

peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.

For example, for a signaling message from UE, corresponding operation information may be "peeling off a radio link message header of a message, and applying message content of the message", or "peeling off a radio link message header of a message, performing, based on the Internet Protocol, IP packetization on message content of the message, and sending data obtained by performing the packetization".

For example, for a signaling message from a control device, corresponding operation information may be "peeling off an IP header of a message, performing, based on an air interface protocol, packetization on message content of the message, and sending data obtained by performing the packetization", or "peeling off an IP header of a message, and applying message content of the message".

It should be noted that, if a matching condition in the control policy includes an RNTI, and an RNTI included in the message sent by the network device is the same as the RNTI included in the matching condition, it is determined that the matching condition is the matching condition that matches the message. If a matching condition in the control policy includes an RNTI and an LCID, an RNTI included in the message sent by the network device is the same as the RNTI included in the matching condition, and an LCID included in the message is the same as the LCID included in the matching condition, it is determined that the matching condition is the matching condition that matches the message.

Optionally, the message may further include a data message.

Correspondingly, the operation may further include: peeling off a radio link message header of a message, and sending message content of the message; or performing, based on an air interface protocol, packetization on the message, and sending data obtained by performing the packetization.

For example, for a data message sent by one UE to another UE or to a server, corresponding operation information may be "peeling off a radio link message header of a message, and sending message content of the message"; for a data message sent by one UE or a server to another UE, corresponding operation information may be "performing, based on an air interface protocol, packetization on the message, and sending data obtained by performing the packetization".

It should be noted that, in the present disclosure, during packetization (for example, during IP packetization performed, based on the Internet Protocol, on message content of a message, or during packetization performed, based on an air interface protocol, on message content of a message), required parameter information may be included in a control policy, or included in operation information corresponding to the control policy.

In this embodiment, a message sent by a network device is received, where the message includes a signaling message; a matching condition that matches the message is determined according to a control policy, where the control policy includes a matching condition and operation information corresponding to the matching condition; the message is processed according to operation information corresponding to the matching condition that matches the message; and the processed message is sent to the network device. In this way, a base station can process a message according to a control policy, and a problem in the prior art that a control device serving as a network control center cannot communicate with the base station is resolved.

Figure 2:
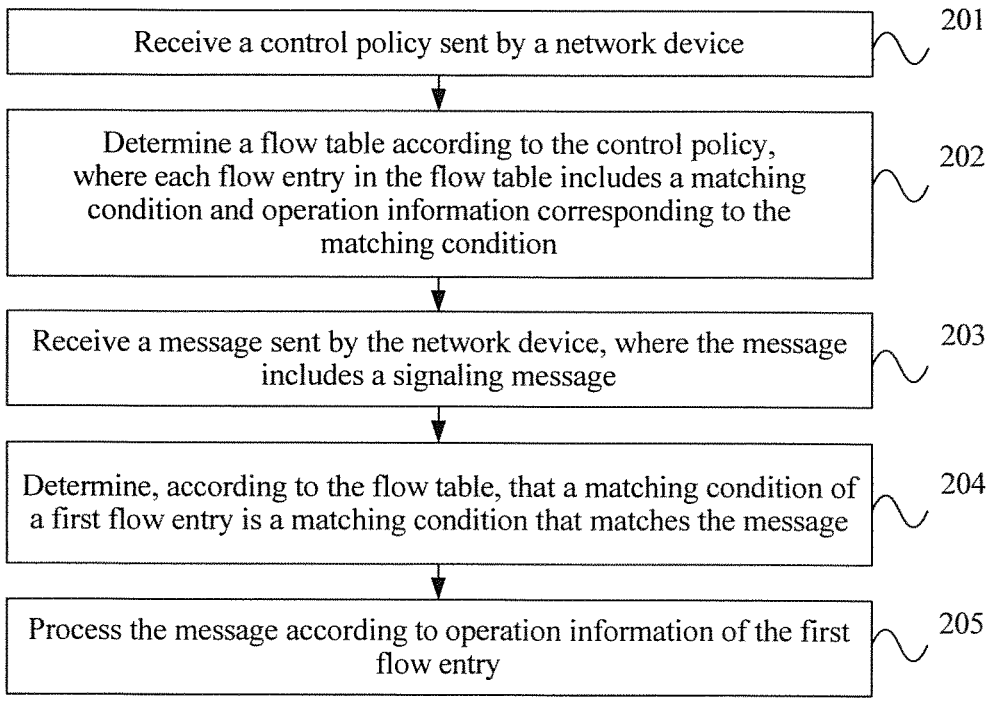
FIG. 2 is a flowchart of Embodiment 2 of a method for performing communication in SDN according to the present disclosure.

FIG. 2 is a flowchart of Embodiment 2 of a method for performing communication in SDN according to the present disclosure. As shown in FIG. 2, the method in this embodiment may include the following steps.

Step 201: Receive a control policy sent by a network device.

Step 202: Determine a flow table according to the control policy, where each flow entry in the flow table includes a matching condition and operation information corresponding to the matching condition.

Step 203: Receive a message sent by the network device, where the message includes a signaling message.

Step 204: Determine, according to the flow table, that a matching condition of a first flow entry is a matching condition that matches the message.

Step 205: Process the message according to operation information of the first flow entry.

Optionally, the flow table may include a second flow entry. A matching condition of the second flow entry includes a source Internet Protocol IP address and a destination IP address. Operation information of the second flow entry includes peeling off an IP header of a message and applying message content of the message. A control policy (the control policy is also sent by using a message) subsequently sent by the network device can be processed by establishing the second flow entry.

Optionally, the second flow entry may be obtained according to configured static information or in a manner of interacting with the network device.

Optionally, after step 205, the method further includes: receiving a policy deletion instruction sent by the network device, where the policy deletion instruction includes a to-be-deleted matching condition; and deleting a third flow entry in the flow table, where the third flow entry is a flow entry that includes the to-be-deleted matching condition.

Optionally, after step 205, the method further includes: receiving a policy update instruction sent by the network device, where the policy update instruction includes a to-be-updated matching condition and to-be-updated operation information; and updating operation information of a fourth flow entry in the flow table to the to-be-updated operation information, where the fourth flow entry is a flow entry that includes the to-be-updated matching condition.

It should be noted that, because the received message sent by the network device may be an uplink message, and may also be a downlink message, the flow table may be divided into an uplink flow table and a downlink flow table. An entry in the uplink flow table is used to process the uplink message, and an entry in the downlink flow table is used to process the downlink message.

In this embodiment, a control policy sent by a network device is received; a flow table is determined according to the control policy; a message sent by the network device is received; it is determined, according to the flow table, that a matching condition of a first flow entry is a matching condition that matches the message; and the message is processed according to operation information of the first flow entry. In this way, the message can be processed (for example, forwarded) by searching the flow table.

Figure 3:
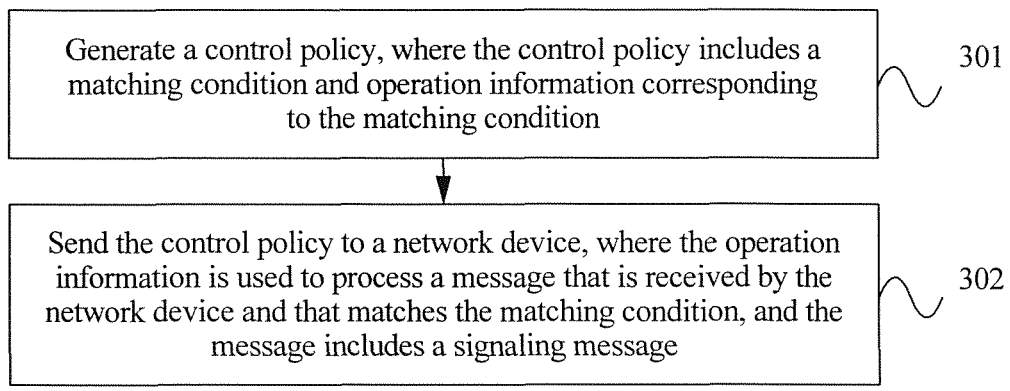
FIG. 3 is a flowchart of Embodiment 3 of a method for performing communication in SDN according to the present disclosure.

FIG. 3 is a flowchart of Embodiment 3 of a method for performing communication in SDN according to the present disclosure. As shown in FIG. 3, the method in this embodiment may include the following steps.

Step 301: Generate a control policy, where the control policy includes a matching condition and operation information corresponding to the matching condition.

Step 302: Send the control policy to a network device, where the operation information is used to process a message that is received by the network device and that matches the matching condition, and the message includes a signaling message.

In this embodiment, a control policy is generated, where the control policy includes a matching condition and operation information corresponding to the matching condition; and the control policy is sent to a network device, where the operation information is used to process a message that is received by the network device and that matches the matching condition, and the message includes a signaling message. In this way, abase station can process a message according to a control policy, and a problem in the prior art that a control device serving as a network control center cannot communicate with the base station is resolved.

It should be noted that, the matching condition and the operation information included in the control policy in this embodiment are similar to those in the embodiment shown in FIG. 1, and details are not described herein.

Optionally, after step 302, the method further includes: sending, according to the matching condition in the control policy, a first signaling message to the network device, so that the network device determines, according to the control policy, a matching condition that matches the first signaling message. In this way, the network device can process the first signaling message according to the control policy.

Optionally, after step 302, the method further includes; sending a policy deletion instruction to the network device, where the policy deletion instruction includes a to-be-deleted matching condition. In this way, the network device can delete, according to the instruction, some flow entries that are no longer required.

Optionally, after step 302, the method further includes: sending a policy update instruction to the network device, where the policy update instruction includes a to-be-updated matching condition and to-be-updated operation information. In this way, the network device can update operation information in some specific flow entries according to the instruction.

Figure 4:
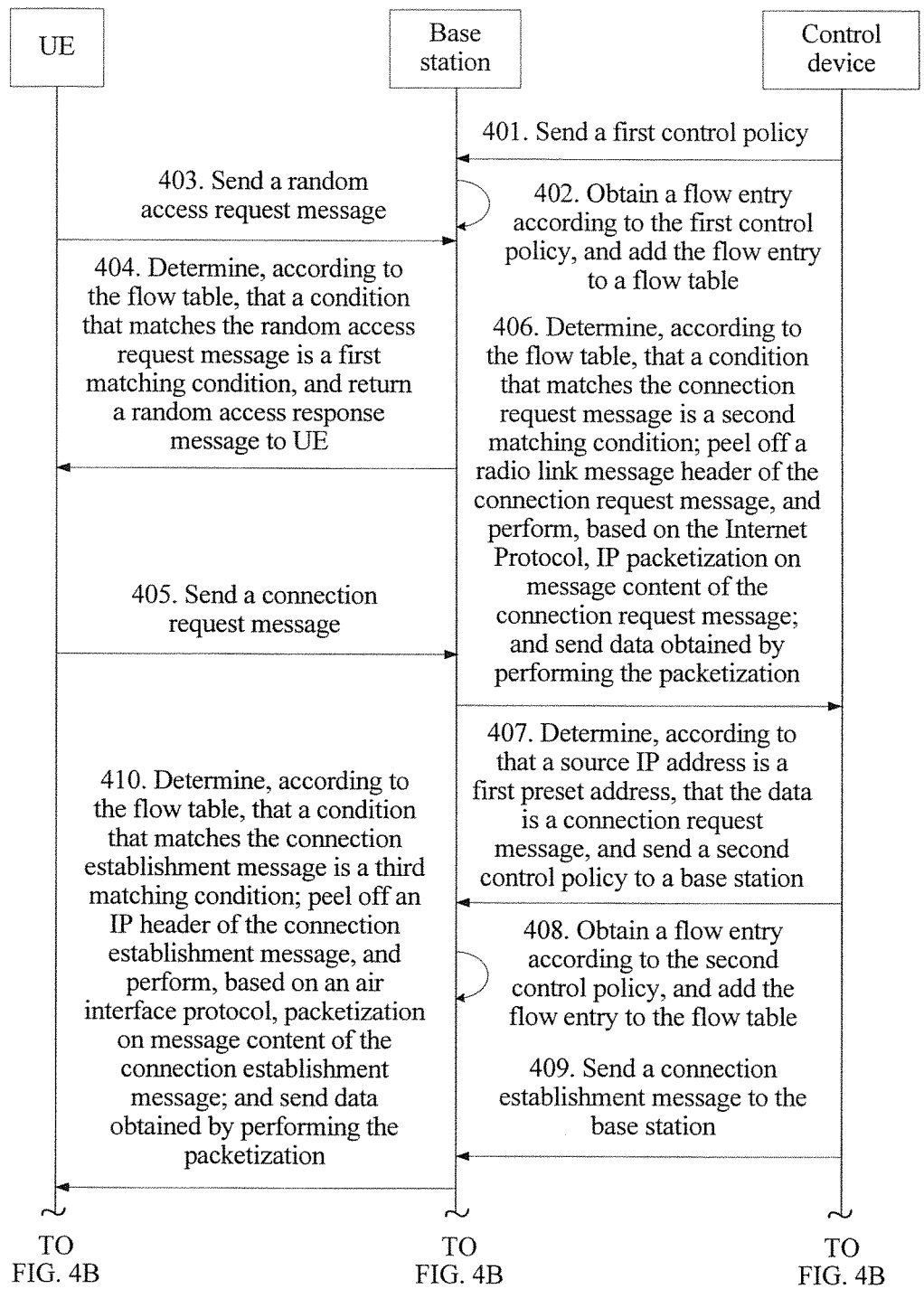
FIG. 4 is a flowchart of Embodiment 4 of a method for performing communication in SDN according to the present disclosure.
Figure 4:
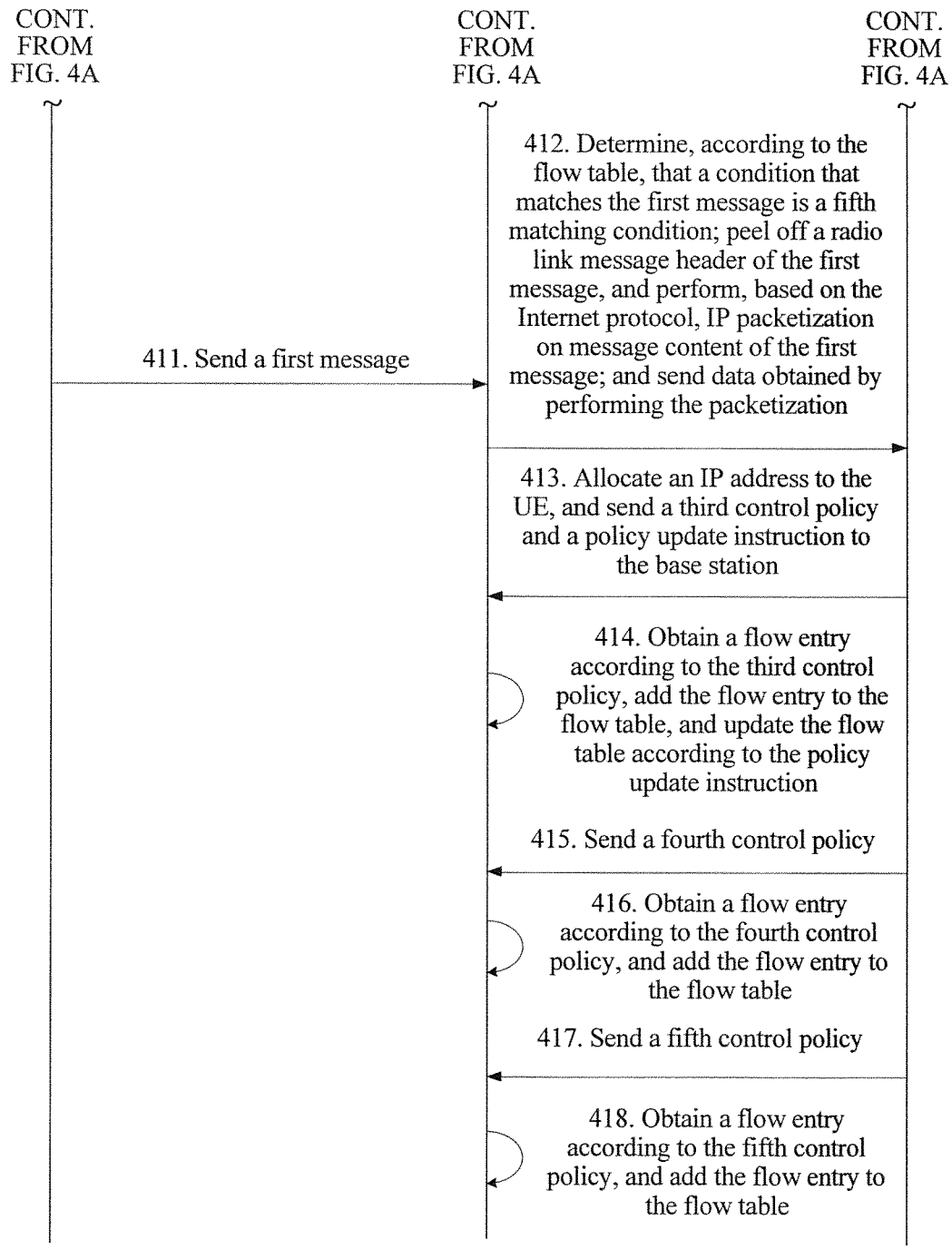

FIG. 4 is a flowchart of Embodiment 4 of a method for performing communication in SDN according to the present disclosure. FIG. 4 uses an example in which a control device sends a control policy to a base station, and the base station processes, according to the control policy, messages sent by the control device and UE. As shown in FIG. 4, the method in this embodiment may include the following steps.

Step 401: The control device sends a first control policy to the base station.

Optionally, the first control policy includes a first matching condition and first operation information corresponding to the first matching condition, and a second matching condition and second operation information corresponding to the second matching condition.

Optionally, the first matching condition includes a channel identifier of a random access channel. The first operation information includes returning a random access response message to the UE.

Optionally, the second matching condition includes a channel identifier of a common control channel. The second match operation includes peeling off a radio link message header (the radio link message header may be a PDCP header, and/or an RLC header, and/or a MAC header) of a message, performing, based on the Internet Protocol, IP packetization on message content of the message, and sending data obtained by performing the packetization. During the IP packetization, a source IP address is set to a first preset address, and a destination IP address is set to an IP address of the control device.

The first preset address is used to indicate to the control device that the message is a connection request message.

It should be noted that, the base station can use the first matching condition and the first operation information to process a random access request message sent by the UE; and the base station can use the second matching condition and the second operation information to process a connection request message sent by the UE.

Optionally, the first control policy may further include a third matching condition and third operation information corresponding to the third matching condition.

Optionally, the third matching condition includes an IP address (corresponding to a source IP address in the third matching condition) of the control device and a second preset address (corresponding to a destination IP address in the third matching condition). The third operation information includes: peeling off an IP header of a message, performing, based on an air interface protocol, packetization (for example, performing encapsulation at PDCP, RLC, MAC, and PHY layers) on message content of the message, and sending data obtained by performing the packetization.

The second preset address is used to indicate to the base station that the message is a message that needs to be sent by means of broadcast.

It should be noted that, the base station can use the third matching condition and the third operation information to process a connection establishment message sent by the control device.

Step 402: The base station obtains a flow entry according to the first control policy, and adds the obtained flow entry to a flow table.

For example, when the first control policy includes three matching conditions, the obtained flow entry includes flow entry 1, flow entry 2, and flow entry 3. Flow entry 1 is corresponding to the first matching condition and the first operation information; flow entry 2 is corresponding to the second matching condition and the second operation information; and flow entry 3 is corresponding to the third matching condition and the third operation information.

It should be noted that, before the base station adds the flow entry obtained according to the first control policy to the flow table, the flow table already includes a second flow entry, and the second flow entry is corresponding to a fourth matching condition and fourth operation information.

Optionally, the fourth matching condition includes the IP address (corresponding to a source IP address in the fourth matching condition) of the control device and an IP address (corresponding to a destination IP address in the fourth matching condition) of the base station. The fourth operation information includes peeling off an IP header of a message, and applying message content of the message.

It should be noted that, the base station can use the fourth matching condition and the fourth operation information to process a control signaling message (for example, a message of the first control policy) sent by the control device to the base station.

Step 403: The UE sends a random access request message to the base station.

Optionally, the random access request message includes a channel identifier of a random access channel.

Step 404: The base station determines, according to the flow table, that a condition that matches the random access request message is the first matching condition, and returns a random access response message to the UE.

Specifically, because the first matching condition includes "a channel identifier of a random access channel", and the random access request message includes the channel identifier of the random access channel, it is determined that the random access request message matches the first matching condition, and the random access request message is further processed according to the first operation information.

Step 405: The UE sends a connection request message to the base station.

Optionally, the connection request message includes a channel identifier of a common control channel.

Step 406: The base station determines, according to the flow table, that a condition that matches the connection request message is the second matching condition; peels off a radio link message header of the connection request message, and performs, based on the Internet Protocol, IP packetization on message content of the connection request message; and sends data obtained by performing the packetization.

During the IP packetization, a source IP address is set to the first preset address, and a destination IP address is set to the IP address of the control device.

Specifically, because the second matching condition includes "a channel identifier of a common control channel", and the connection request message includes the channel identifier of the common control channel, it is determined that the connection request message matches the second matching condition, and the connection request message is further processed according to the second operation information.

Step 407: The control device determines, according to that a source IP address is a first preset address, that the data is a connection request message, and sends a second control policy to the base station.

Optionally, the second control policy includes a fifth matching condition and fifth operation information corresponding to the fifth matching condition, and a sixth matching condition and sixth operation information corresponding to the sixth matching condition.

Optionally, the fifth matching condition includes an RNTI of the UE, an LCID of a logical link used by the UE for sending signaling to the control device. The fifth operation information includes peeling off a radio link message header of a message, performing, based on the Internet Protocol, IP packetization on message content of the message, and sending data obtained by performing the packetization.

During the IP packetization, a source IP address is set to a third preset address, and a destination IP address is set to the IP address of the control device.

The third preset address is used to indicate to the control device that the message is a message sent by the UE to the control device.

It should be noted that, the base station can use the fifth matching condition and the fifth operation information to process the message sent by the UE to the control device. Because the control device has not allocated an IP address to the UE at this time point, the fifth operation information needs to be updated in a subsequent step.

Optionally, the sixth matching condition includes the RNTI of the UE, and an LCID of a logical link used by the UE for sending signaling to the base station. The sixth operation information includes peeling off a radio link message header of a message, and applying message content of the message.

It should be noted that, the base station can use the sixth matching condition and the sixth operation information to process the signaling message sent by the UE to the base station.

Step 408: The base station obtains a flow entry according to the second control policy, and adds the obtained flow entry to the flow table.

It should be noted that, step 408 is similar to step 402, and details are not described herein.

Step 409: The control device sends a connection establishment message to the base station.

Optionally, the connection establishment message includes the IP address of the control device and the second preset address.

Step 410: The base station determines, according to the flow table, that a condition that matches the connection establishment message is a third matching condition, peels off an IP header of the connection establishment message, performs, based on an air interface protocol, packetization on message content of the connection establishment message, and sends data obtained by performing the packetization.

Specifically, because the third matching condition includes "an IP address of the control device and a second preset address", and the connection establishment message includes the IP address of the control device and the second preset address, it is determined that the connection request message matches the third matching condition, and the connection establishment message is further processed according to the third operation information.

Step 411: The UE sends a first message to the base station.

Optionally, the first message may be an attach message of the UE for accessing the network.

Optionally, the first message includes the RNTI of the UE, and the LCID the logical link used by the UE when sending the signaling to the control device.

Step 412: The base station determines, according to the flow table, that a condition that matches the first message is a fifth matching condition, peels off a radio link message header of the first message, performs, based on the Internet Protocol, IP packetization on message content of the first message, and sends data obtained by performing the packetization.

During the IP packetization, a source IP address is set to the third preset IP address, and a destination IP address is set to the IP address of the control device.

Step 413: The control device allocates an IP address to the UE, and sends a third control policy and a policy update instruction to the base station.

The policy update instruction includes the fifth matching condition and updated fifth operation information.

Optionally, the updated fifth operation information includes peeling off a radio link message header of a message, performing, based on the Internet Protocol, IP packetization on message content of the message, and sending data obtained by performing the packetization. During the IP packetization, a source IP address is set to the IP address of the UE, and a destination IP address is set to the IP address of the control device.

Optionally, the third control policy includes a seventh matching condition and seventh operation information corresponding to the seventh matching condition.

The seventh matching condition includes the IP address (corresponding to a source IP address in the seventh matching condition) of the control device and the IP address (corresponding to a destination IP address in the seventh matching condition) of the UE.

The seventh operation information includes peeling off an IP header of a message, performing, based on an air interface protocol, packetization on message content of the message, and sending data obtained by performing the packetization.

It should be noted that, the base station can use the seventh matching condition and the seventh operation information to process a message sent by the control device to the UE.

It should be noted that, the third control policy and the policy update instruction may be sent to the base station at the same time by using one message, or may be sent to the base station by using two messages.

Step 414: The base station obtains a flow entry according to the third control policy, adds the obtained flow entry to the flow table, and updates the flow table according to the policy update instruction.

It should be noted that, because a base station side processes, in different manners, the third control policy and the policy update instruction that are both sent from the control device, the control device can use another identifier in second message content to instruct the base station to perform corresponding processing.

It should be noted that, step 414 is similar to step 402, and details are not described herein.

Step 415: The control device sends a fourth control policy to the base station.

Optionally, the fourth control policy includes an eighth matching condition and eighth policy information corresponding to the eighth matching condition, and a ninth matching condition and ninth operation information corresponding to the ninth matching condition.

Optionally, the eighth matching condition includes the RNTI of the UE, and an LCID of a logical link used by the UE for transmitting data with the base station.

The eighth operation information includes peeling off a radio link message header of a message, and sending message content of the message.

It should be noted that, the base station can use the eighth matching condition and the eighth operation information to process a data message sent by the UE to another UE or to a server.

Data transmission exists between the other UE or the server and the UE.

Optionally, the ninth matching condition includes an IP address (corresponding to a source IP address in the ninth matching condition) of the server (or the other UE) and an IP address (corresponding to a destination IP address in the ninth matching condition) of the UE.

The ninth operation information includes performing, based on an air interface protocol, packetization on a message, and sending data obtained by performing the packetization.

It should be noted that, the base station can use the ninth matching condition and the ninth operation information to process a data message sent by the other UE or the server to the UE.

Step 416: The base station obtains a flow entry according to the fourth control policy, and adds the obtained flow entry to the flow table.

It should be noted that, step 416 is similar to step 402, and details are not described herein.

Step 417: The control device sends a fifth control policy to the base station.

Optionally, the fifth control policy includes a tenth matching condition and tenth policy information corresponding to the tenth matching condition.

Optionally, the tenth matching condition includes the IP address (corresponding to a source IP address in the tenth matching condition) of the control device and a fourth preset address (corresponding to a destination IP address in the tenth matching condition). The tenth operation information includes peeling off an IP header of a message, and sending message content of the message by using a paging channel.

The fourth preset address is used to indicate to the base station that the message is a paging message.

It should be noted that, the base station can use the tenth matching condition and the tenth operation information to process the paging message.

It should be noted that, in this embodiment, the first preset address may be the same as the second preset address, the third preset address, or the fourth preset address.

Step 418: The base station obtains a flow entry according to the fifth control policy, and adds the obtained flow entry to the flow table.

It should be noted that, step 418 is similar to step 402, and details are not described herein.

It should be noted that, step 415 and step 417 are not performed in a sequence.

In this embodiment, a control device sends different control policies to a base station in different phases (a network-accessing phase (that is, before the UE obtains an IP address), and a post-network-access phase (that is, after the UE obtains the IP address)) of the UE, so that a corresponding control policy can be determined between the base station and the control device in any phase, so as to process a related message of the UE.

It should be noted that, this embodiment focuses on describing how a control device sends a control policy to a base station and how the base station processes a message according to the control policy in different phases of a communication process, instead of describing a complete communication process. For example, this embodiment does not include a related process in which the control device notifies the UE of information such as an RNTI allocated to the UE.

It should be noted that, in this embodiment, a sequence in which the control device sends a matching condition and operation information corresponding to the matching condition to the base station is merely an example, and this example does not limit a sequence in which the control device sends a matching condition and operation information corresponding to the matching condition to the base station, provided that the control device can send, to the base station before the base station processes a piece or a type of message, a related matching condition and operation information corresponding to the matching condition for processing this piece or this type of message.

It should be noted that, in Embodiment 1, Embodiment 2, or Embodiment 3 of the method for performing communication in the SDN, the control policy may be the first control policy, the second control policy, the third control policy, the fourth control policy, or the fifth control policy in method Embodiment 4, the matching condition may be the first matching condition, the second matching condition, or the like in method Embodiment 4, and the operation information may be the first operation information, the second operation information, or the like in method Embodiment 4.

Figure 5:
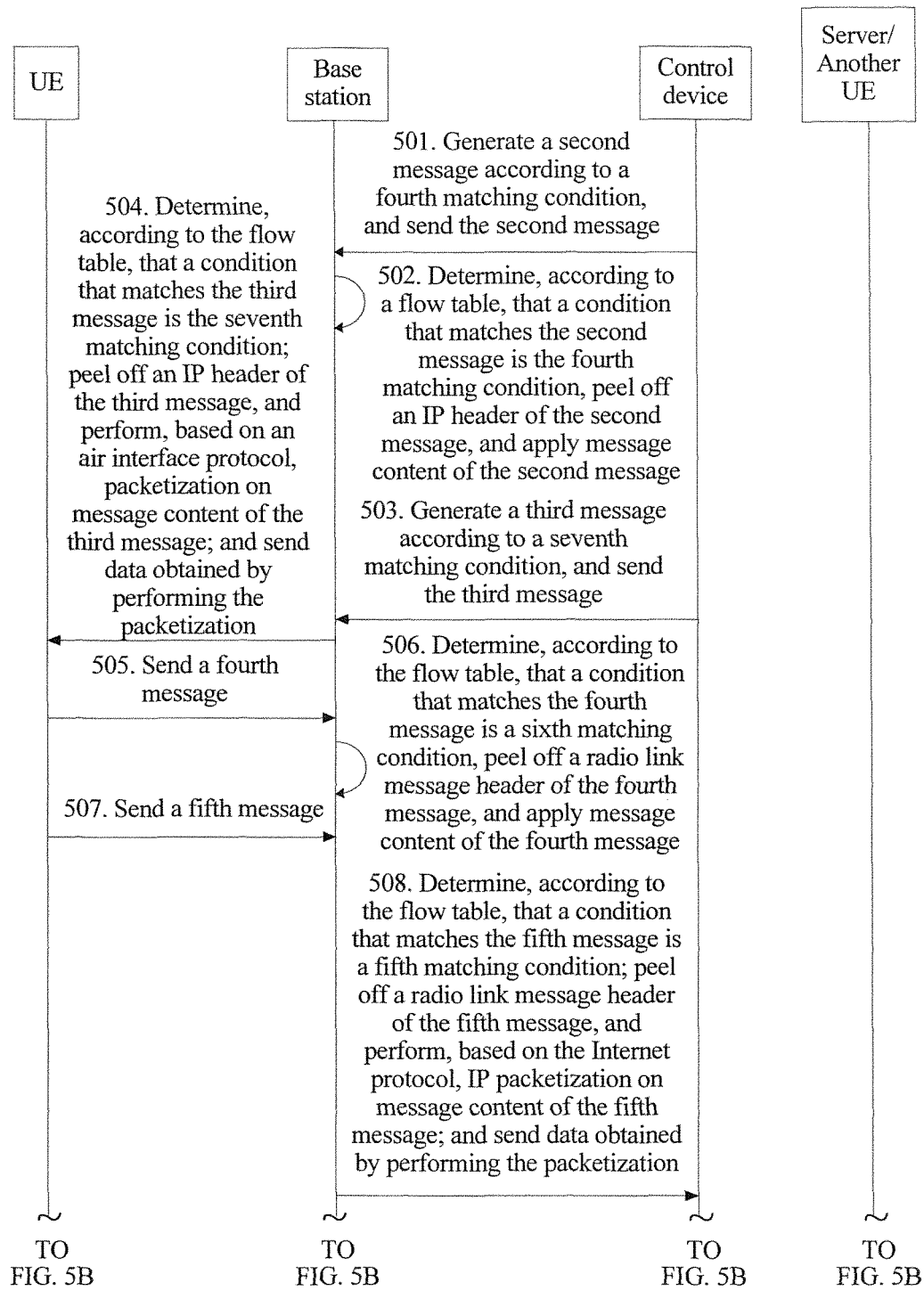
FIG. 5 is a flowchart of Embodiment 5 of a method for performing communication in SDN according to the present disclosure.
Figure 5:
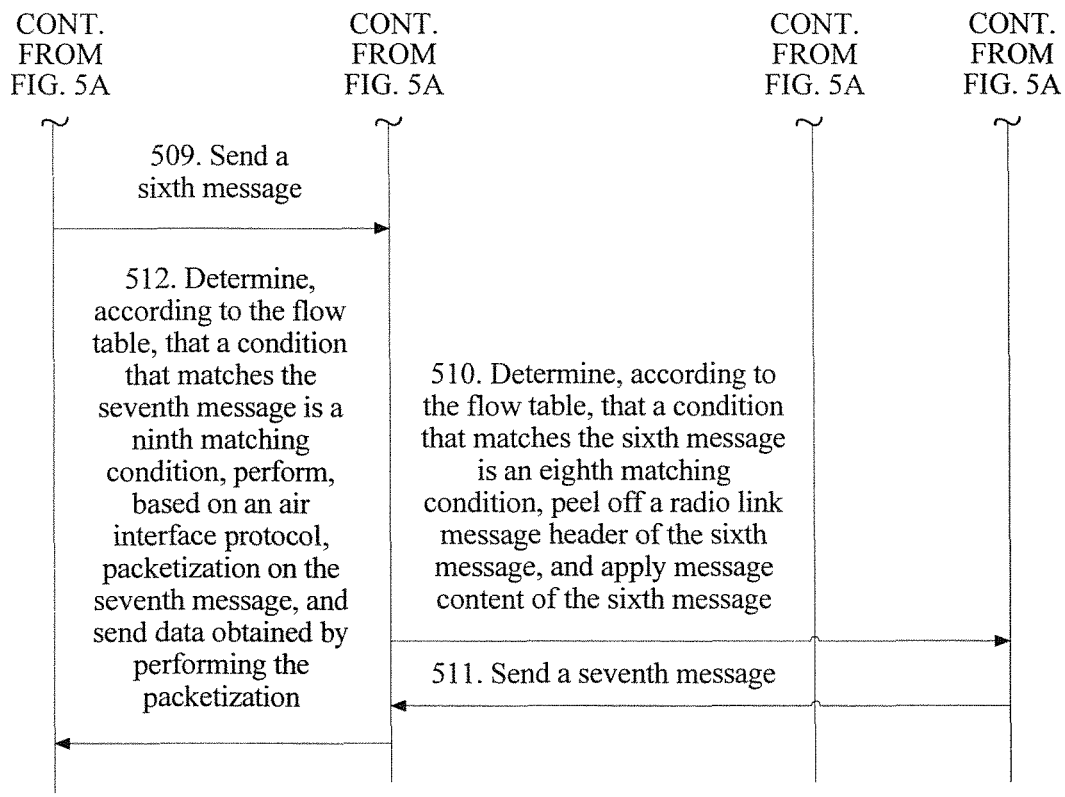

FIG. 5 is a flowchart of Embodiment 5 of a method for performing communication in SDN according to the present disclosure. FIG. 5 uses an example in which a base station processes, according to a control policy, a message sent by a control device, UE, a server, or another UE. As shown in FIG. 5, the method in this embodiment may include the following steps.

Step 501: The control device generates a second message according to a fourth matching condition, and sends the second message.

The second message is a signaling message sent by the control device to the base station, a source address of the second message is an IP address of the control device, and a destination address of the second message is an IP address of the base station.

Step 502: The base station receives the second message; determines, according to a flow table, that a condition that matches the second message is the fourth matching condition; and peels off an IP header of the second message, and applies message content of the second message.

Step 503: The control device generates a third message according to a seventh matching condition, and sends the third message.

The third message is a signaling message sent by the control device to the UE, a source address of the third message is the IP address of the control device, and a destination address of the third message is an IP address of the UE.

Step 504: The base station receives the third message; determines, according to the flow table, that a condition that matches the third message is the seventh matching condition; and peels off an IP header of the third message, performs, based on an air interface protocol, packetization on message content of the third message, and sends data obtained by performing the packetization.

Step 505: The UE sends a fourth message to the base station.

The fourth message is a signaling message sent by the UE to the base station.

Optionally, the fourth message includes an RNTI of the UE, and an LCID of a logical link used by the UE for communicating with the base station.

Step 506: The base station receives the fourth message; determines, according to the flow table, that a condition that matches the fourth message is a sixth matching condition; and peels off a radio link message header of the fourth message, and applies message content of the fourth message.

Step 507: The UE sends a fifth message to the base station.

The fifth message is a signaling message sent by the UE to the control device.

Optionally, the fifth message includes the RNTI of the UE, and an LCID of a logical link used by the UE for communicating with the control device.

Step 508: The base station receives the fifth message; determines, according to the flow table, that a condition that matches the fifth message is a fifth matching condition; and peels off a radio link message header of the fifth message, performs, based on the Internet Protocol, IP packetization on message content of the fifth message, and sends data obtained by performing the packetization.

During the IP packetization, a source IP address is set to the IP address of the UE, and a destination IP address is set to the IP address of the control device.

Step 509: The UE sends a sixth message to the base station.

The sixth message is a data message sent by the UE to the other UE (or to the server).

Optionally, the sixth message includes the RNTI of the UE, and an LCID of a logical link used by the UE for transmitting data with the base station.

Step 510: The base station receives the sixth message; determines, according to the flow table, that a condition that matches the sixth message is an eighth matching condition; and peels off a radio link message header of the sixth message, and sends message content of the sixth message.

Step 511: The other UE (or the server) sends a seventh message to the base station.

The seventh message is a data message sent by the other UE (or the server) to the UE.

Optionally, the seventh message includes an IP address of the other UE (or the server) and the IP address of the UE.

Step 512: The base station receives the seventh message; determines, according to the flow table, that a condition that matches the seventh message is a ninth matching condition; and performs, based on an air interface protocol, packetization on the seventh message, and uses a paging (paging) channel to send data obtained by performing the packetization.

It should be noted that, in this embodiment, step 501, step 503, step 505, step 507, step 509, and step 511 are not performed in a sequence.

In this embodiment, a base station determines, according to a flow table, a matching condition that matches a message (for example, a third message or a fourth message), and processes the message according to operation information corresponding to the matching condition. In this way, a base station can process a message according to a control policy, and a problem in the prior art that a control device serving as a network control center cannot communicate with the base station is resolved.

Figure 6:
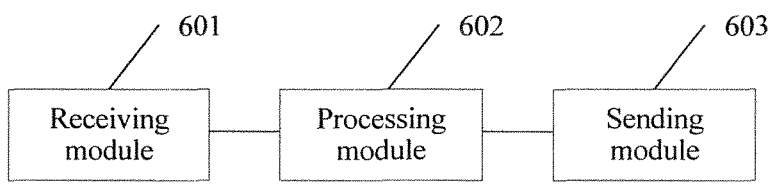
FIG. 6 is a schematic structural diagram of Embodiment 1 of an apparatus for performing communication in SDN according to the present disclosure.

FIG. 6 is a schematic structural diagram of Embodiment 1 of an apparatus for performing communication in SDN according to the present disclosure. The apparatus is a network device. As shown in FIG. 6, the apparatus in this embodiment may include a receiving module 601, a processing module 602, and a sending module 603. The receiving module 601 is configured to receive a message sent by a network device, where the message includes a signaling message. The processing module 602 is configured to determine, according to a control policy, a matching condition that matches the message, where the control policy includes a matching condition and operation information corresponding to the matching condition; and process the message according to the operation information corresponding to the matching condition that matches the message. The sending module 603 is configured to send the processed message to the network device.

Optionally, the matching condition in the control policy includes at least one of the following conditions:

a radio network temporary identifier (RNTI), a channel identifier, a logical channel identifier (LCID), an antenna identifier, a source IP address, a destination IP address, a source port, or a destination port.

Optionally, the operation information in the control policy includes at least one of the following operations:

peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.

Optionally, the message may further include a data message.

Correspondingly, the operation may further include: peeling off a radio link message header of a message, and sending message content of the message; or performing, based on an air interface protocol, packetization on the message, and sending data obtained by performing the packetization.

The apparatus in this embodiment may be configured to execute the technical solution in the method embodiment shown in FIG. 1, and implementation principles and technical effects thereof are similar, and details are not described herein.

Embodiment 2 of the apparatus for performing communication in the SDN:

Optionally, based on Embodiment 1 of the apparatus for performing communication in the SDN according to the present disclosure, the receiving module 601 is further configured to receive the control policy sent by the network device.

Optionally, the processing module 602 is further configured to determine a flow table according to the control policy. Each flow entry in the flow table includes a matching condition and operation information corresponding to the matching condition.

Correspondingly, the processing module 602 is specifically configured to determine, according to the flow table, that a matching condition of a first flow entry is the matching condition that matches the message, and process the message according to operation information of the first flow entry.

Optionally, the flow table further includes a second flow entry. A matching condition of the second flow entry includes a source Internet Protocol IP address and a destination IP address, and operation information of the second flow entry includes peeling off an IP header of a message and applying message content of the message.

The apparatus in this embodiment may be configured to execute the technical solutions of a base station side in the method embodiments shown in FIG. 1 and FIG. 2 and the method embodiments shown in FIG. 4 and FIG. 5, and implementation principles and technical effects thereof are similar, and details are not described herein.

Figure 7:
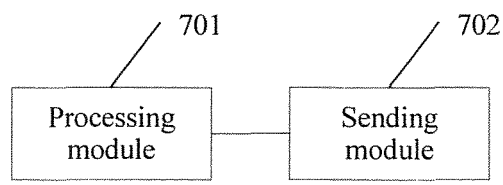
FIG. 7 is a schematic structural diagram of Embodiment 3 of an apparatus for performing communication in SDN according to the present disclosure.

FIG. 7 is a schematic structural diagram of Embodiment 3 of an apparatus for performing communication in SDN according to the present disclosure. The apparatus is a network device. As shown in FIG. 7, the apparatus in this embodiment may include a processing module 701 and a sending module 702. The processing module 701 is configured to generate a control policy, where the control policy includes a matching condition and operation information corresponding to the matching condition. The sending module 702 is configured to send the control policy to a network device, where the operation information is used to process a message that is received by the network device and that matches the matching condition, and the message includes a signaling message.

Optionally, the matching condition in the control policy includes at least one of the following conditions:

a radio network temporary identifier RNTI, a channel identifier, a logical channel identifier LCID, an antenna identifier, a source Internet Protocol IP address, a destination IP address, a source port, or a destination port.

Optionally, the operation information in the control policy includes at least one of the following operations:

peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.

Optionally, the message further includes a data message; and the operation further includes: peeling off a radio link message header of a message, and sending message content of the message; or performing, based on an air interface protocol, packetization on the message, and sending data obtained by performing the packetization.

Optionally, the processing module 701 is further configured to generate a first signaling message according to the matching condition in the control policy. The sending module is further configured to send the first signaling message to the network device, so that the network device determines, according to the control policy, a matching condition that matches the first signaling message.

The apparatus in this embodiment may be configured to execute the technical solutions of a control device side in the method embodiment shown in FIG. 3 and the method embodiments shown in FIG. 4 and FIG. 5, and implementation principles and technical effects thereof are similar, and details are not described herein.

The present disclosure further provides a communications system. The communications system includes the network device according to Embodiment 1 or Embodiment 2 of the apparatus for performing communication in the SDN and the network device according to Embodiment 3 of the apparatus for performing communication in the SDN.

Figure 8:
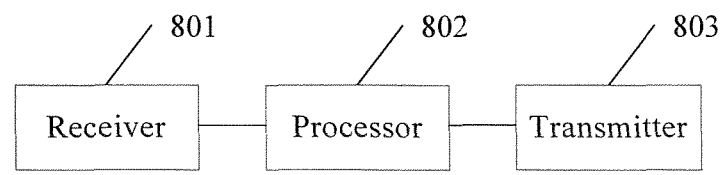
FIG. 8 is a schematic structural diagram of Embodiment 4 of an apparatus for performing communication in SDN according to the present disclosure.

FIG. 8 is a schematic structural diagram of Embodiment 4 of an apparatus for performing communication in SDN according to the present disclosure. The apparatus is a network device. As shown in FIG. 8, the apparatus in this embodiment may include a receiver 801, a processor 802, and a transmitter 803. The receiver 801 is configured to receive a message sent by a network device, where the message includes a signaling message. The processor 802 is configured to determine, according to a control policy, a matching condition that matches the message, where the control policy includes a matching condition and operation information corresponding to the matching condition; and process the message according to the operation information corresponding to the matching condition that matches the message. The transmitter 803 is configured to send the processed message to the network device.

Optionally, the matching condition in the control policy includes at least one of the following conditions:

a radio network temporary identifier (RNTI), a channel identifier, a logical channel identifier (LCID), an antenna identifier, a source IP address, a destination IP address, a source port, or a destination port.

Optionally, the operation information in the control policy includes at least one of the following operations:

peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.

Optionally, the message may further include a data message.

Correspondingly, the operation may further include: peeling off a radio link message header of a message, and sending message content of the message; or performing, based on an air interface protocol, packetization on the message, and sending data obtained by performing the packetization.

The apparatus in this embodiment may be configured to execute the technical solution in the method embodiment shown in FIG. 1, and implementation principles and technical effects thereof are similar, and details are not described herein.

Embodiment 5 of the apparatus for performing communication in the SDN:

Optionally, based on Embodiment 1 of the apparatus for performing communication in the SDN according to the present disclosure, the receiver 801 is further configured to receive the control policy sent by the network device.

Optionally, the processor 802 is further configured to determine a flow table according to the control policy. Each flow entry in the flow table includes a matching condition and operation information corresponding to the matching condition.

Correspondingly, the processor 802 is specifically configured to determine, according to the flow table, that a matching condition of a first flow entry is the matching condition that matches the message, and process the message according to operation information of the first flow entry.

Optionally, the flow table further includes a second flow entry. A matching condition of the second flow entry includes a source Internet Protocol IP address and a destination IP address, and operation information of the second flow entry includes peeling off an IP header of a message and applying message content of the message.

The apparatus in this embodiment may be configured to execute the technical solutions of a base station side in the method embodiments shown in FIG. 1 and FIG. 2 and the method embodiments shown in FIG. 4 and FIG. 5, and implementation principles and technical effects thereof are similar, and details are not described herein.

Figure 9:
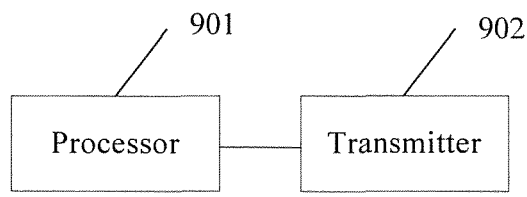
FIG. 9 is a schematic structural diagram of Embodiment 6 of an apparatus for performing communication in SDN according to the present disclosure.

FIG. 9 is a schematic structural diagram of Embodiment 6 of an apparatus for performing communication in SDN according to the present disclosure. The apparatus is a network device. As shown in FIG. 9, the apparatus in this embodiment may include a processor 901 and a transmitter 902. The processor 901 is configured to generate a control policy, where the control policy includes a matching condition and operation information corresponding to the matching condition. The transmitter 902 is configured to send the control policy to a network device, where the operation information is used to process a message that is received by the network device and that matches the matching condition, and the message includes a signaling message.

Optionally, the matching condition in the control policy includes at least one of the following conditions:

a radio network temporary identifier RNTI, a channel identifier, a logical channel identifier LCID, an antenna identifier, a source Internet Protocol IP address, a destination IP address, a source port, or a destination port.

Optionally, the operation information in the control policy includes at least one of the following operations:

peeling off a radio link message header of a message, performing, based on the Internet Protocol, IP packetization on message content of the message, and sending data obtained by performing the packetization; peeling off a radio link message header of a message, and applying message content of the message; peeling off an IP header of a message, performing, based on an air interface protocol, packetization on message content of the message, and sending data obtained by performing the packetization; or peeling off an IP header of a message, and applying message content of the message.

Optionally, the message further includes a data message; and the operation further includes: peeling off a radio link message header of a message, and sending message content of the message; or performing, based on an air interface protocol, packetization on the message, and sending data obtained by performing the packetization.

Optionally, the processor 901 is further configured to generate a first signaling message according to the matching condition in the control policy. The sending module is further configured to send the first signaling message to the network device, so that the network device determines, according to the control policy, a matching condition that matches the first signaling message.

The apparatus in this embodiment may be configured to execute the technical solutions of a control device side in the method embodiment shown in FIG. 3 and the method embodiments shown in FIG. 4 and FIG. 5, and implementation principles and technical effects thereof are similar, and details are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for performing communication in software-defined networking, the method comprising:
receiving a message sent by a network device and comprising a signaling message;
determining, according to a control policy, a matching condition that matches the message, wherein the control policy comprises the matching condition and operation information corresponding to the matching condition;
processing the message according to the operation information corresponding to the matching condition that matches the message; and
sending the processed message to the network device,
wherein the operation information comprises information about at least one of the following operations:
peeling off a radio link message header of a message, performing, based on Internet Protocol (IP), IP packetization on message content of the message, and sending data obtained by performing the IP packetization;
peeling off a radio link message header of a message, and applying message content of the message;
peeling off an IP header of a message, performing, based on an air interface protocol, packetization on message content of the message, and sending data obtained by performing the packetization; or
peeling off an IP header of a message, and applying message content of the message.

2. The method according to claim 1, wherein before determining, according to a control policy, a matching condition that matches the message, the method further comprises:
receiving the control policy sent by the network device.

3. The method according to claim 1, further comprising:
determining a flow table according to the control policy, wherein each flow entry in the flow table comprises a matching condition and operation information corresponding to the matching condition;
wherein determining a matching condition that matches the message comprises:
determining, according to the flow table, that a matching condition of a first flow entry is the matching condition that matches the message; and
wherein processing the message according to the operation information corresponding to the matching condition that matches the message comprises:
processing the message according to operation information of the first flow entry.

4. The method according to claim 3, wherein the flow table further comprises a second flow entry, a matching condition of the second flow entry comprises a source IP address and a destination IP address, and operation information of the second flow entry comprises information about peeling off an IP header of a message and applying message content of the message.

5. The method according to claim 1, wherein the matching condition in the control policy comprises at least one of the following:
a radio network temporary identifier (RNTI), a channel identifier, a logical channel identifier (LCID), an antenna identifier, a source IP address, a destination IP address, a source port, or a destination port.

6. The method according to claim 1, wherein:
the message further comprises a data message; and
the operation information further comprises information about at least one of the following operations:
peeling off a radio link message header of a message, and sending message content of the message, or
performing, based on an air interface protocol, packetization on the message, and sending data obtained by performing the packetization.

7. A method for performing communication in software-defined networking, the method comprising:
generating a control policy comprising a matching condition and operation information corresponding to the matching condition; and
sending the control policy to a network device for processing, according to the operation ration, a message received by the network device and that matches the matching condition, wherein the message comprises a signaling message,
wherein the operation information comprises information about at least one of the following operations:
peeling off a radio link message header of a message, performing, based on Internet Protocol (IP), IP packetization on message content of the message, and sending data obtained by performing the IP packetization;
peeling off a radio link message header of a message, and applying message content of the message;
peeling off an IP header of a message, performing, based on an air interface protocol, packetization on message content of the message, and sending data obtained by performing the packetization; or
peeling off an IP header of a message, and applying message content of the message.

8. The method according to claim 7, wherein the matching condition in the control policy comprises at least one of the following:
a radio network temporary identifier (RNTI), a channel identifier, a logical channel identifier (LCID), an antenna identifier, a source Internet Protocol (IP) address and a destination IP address, or a source port and a destination port.

9. The method according to claim 7, wherein:
the message further comprises a data message; and
the operation information further comprises information about at least one of the following operations:
peeling off a radio link message header of a message, and sending message content of the message, or
performing, based on an air interface protocol, packetization on the message, and sending data obtained by performing the packetization.

10. The method according to claim 7, wherein after sending the control policy to a network device, the method further comprises:
sending a first signaling message to the network device according to the matching condition in the control policy for the network device to determine, according to the control policy, a matching condition that matches the first signaling message.

11. A network device for performing communication in software-defined networking, the network device comprising:
a receiver, configured to receive a message sent by a second network device and comprising a signaling message;

a processor, configured to:
  determine, according to a control policy, a matching condition that matches the message, wherein the control policy comprises the matching condition and operation information corresponding to the matching condition, and
  process the message according to the operation information corresponding to the matching condition that matches the message; and
a transmitter, configured to send the processed message to the second network device
wherein the operation information comprises information about at least one of the following operations:
  peeling off a radio link message header of a message, performing, based on Internet Protocol (IP), IP packetization on message content of the message, and sending data obtained by performing the IP packetization;
  peeling off a radio link message header of a message, and applying message content of the message;
  peeling off an IP header of a message, performing, based on an air interface protocol, packetization on message content of the message, and sending data obtained by performing the packetization; or
  peeling off an IP header of a message, and applying message content of the message.

12. The network device according to claim 11, wherein the receiver is further configured to receive the control policy sent by the second network device.

13. The network device according to claim 11, wherein the processor is further configured to:
  determine a flow table according to the control policy, wherein each flow entry in the flow table comprises a matching condition and operation information corresponding to the matching condition;
  determine, according to the flow table, that a matching condition of a first flow entry is the matching condition that matches the message; and
  process the message according to operation information of the first flow entry.

14. The network device according to claim 13, wherein the flow table further comprises a second flow entry, a matching condition of the second flow entry comprises a source IP address and a destination IP address, and operation information of the second flow entry comprises information about peeling off an IP header of a message and applying message content of the message.

15. The network device according to claim 11, wherein the matching condition in the control policy comprises at least one of the following:
  a radio network temporary identifier (RNTI), a channel identifier, a logical channel identifier (LCID), an antenna identifier, a source IP address and a destination IP address, or a source port and a destination port.

16. A network device for performing communication in software-defined networking, the network device comprising:
  a processor, configured to generate a control policy comprising a matching condition and operation information corresponding to the matching condition; and
  a transmitter, configured to send the control policy to a second network device for processing a message received by the second network device and that matches the matching condition, wherein the message comprises a signaling message,
  wherein the operation information comprises information about at least one of the following operations:
    peeling off a radio link message header of a message, performing, based on Internet Protocol (IP), IP packetization on message content of the message, and sending data obtained by performing the IP packetization;
    peeling off a radio link message header of a message, and applying message content of the message;
    peeling off an IP header of a message, performing, based on an air interface protocol, packetization on message content of the message, and sending data obtained by performing the packetization; or
    peeling off an IP header of a message, and applying message content of the message.

17. The network device according to claim 16, wherein the matching condition in the control policy comprises at least one of the following:
  a radio network temporary identifier (RNTI), a channel identifier, a logical channel identifier (LCID), an antenna identifier, a source Internet Protocol (IP) address and a destination IP address, or a source port and a destination port.

* * * * *